United States Patent
Fukuda et al.

(10) Patent No.: US 11,840,600 B2
(45) Date of Patent: Dec. 12, 2023

(54) CURED EPOXY RESIN MATERIAL, EPOXY RESIN COMPOSITION, MOLDED ARTICLE, AND COMPOSITE MATERIAL

(71) Applicant: Hitachi Chemical Company, Ltd., Tokyo (JP)

(72) Inventors: Kazumasa Fukuda, Tokyo (JP); Yoshitaka Takezawa, Tokyo (JP); Naoki Maruyama, Tokyo (JP); Yuka Yoshida, Tokyo (JP); Tomoko Higashiuchi, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 354 days.

(21) Appl. No.: 16/642,532

(22) PCT Filed: Aug. 30, 2017

(86) PCT No.: PCT/JP2017/031209
§ 371 (c)(1),
(2) Date: Feb. 27, 2020

(87) PCT Pub. No.: WO2019/043843
PCT Pub. Date: Mar. 7, 2019

(65) Prior Publication Data
US 2021/0054133 A1 Feb. 25, 2021

(51) Int. Cl.
| B32B 27/38 | (2006.01) |
| B32B 27/26 | (2006.01) |
| C08G 59/50 | (2006.01) |
| C08L 63/00 | (2006.01) |
| C08G 59/24 | (2006.01) |
| C08G 59/40 | (2006.01) |

(52) U.S. Cl.
CPC ....... *C08G 59/245* (2013.01); *C08G 59/4085* (2013.01); *C08G 59/5033* (2013.01); *C08L 63/00* (2013.01); *C08L 2201/08* (2013.01); *C08L 2203/30* (2013.01)

(58) Field of Classification Search
None
See application file for complete search history.

(56) References Cited

U.S. PATENT DOCUMENTS

| 5,266,405 A | * | 11/1993 | Kirchmeyer | ....... C08G 59/5033 |
| | | | | 528/109 |
| 2004/0102597 A1 | * | 5/2004 | Tobita | ................ H01L 23/3737 |
| | | | | 528/403 |
| 2012/0149807 A1 | * | 6/2012 | Asaumi | ................ C07D 303/30 |
| | | | | 560/72 |
| 2013/0284502 A1 | * | 10/2013 | Park | ....................... C08G 59/28 |
| | | | | 174/255 |
| 2014/0162072 A1 | * | 6/2014 | Suzuki | ............... C08G 59/5033 |
| | | | | 523/466 |
| 2016/0009947 A1 | * | 1/2016 | Sugiyama | ............... H01L 24/83 |
| | | | | 523/400 |
| 2017/0349695 A1 | * | 12/2017 | Katagi | ....................... C08J 5/18 |

FOREIGN PATENT DOCUMENTS

| CN | 103555242 A | 2/2014 |
| CN | 107108856 A | 8/2017 |
| JP | 2011-74366 A | 4/2011 |
| JP | 2012-233206 A | 11/2012 |
| JP | 5471975 B2 | 4/2014 |
| WO | WO-2016/104788 A1 | 6/2016 |
| WO | WO-2016104772 A1 * | 6/2016 ............. C08G 59/24 |

OTHER PUBLICATIONS

Tomoi, Masao et al., "Recent Trends in Toughening of Epoxy Resins," Network Polymer, 20, 2, 1999, pp. 97-110, including English Abstract.

Li Huo, "Research on synthesis, curing and properties of Bisphenol-S and Bisphenol-F liquid crystalline epoxy compounds", Hebei University PhD Thesis, Jan. 15, 2012, pp. 15, 40-41, 79-84, including English Abstract.

\* cited by examiner

*Primary Examiner* — Michael J Feely

(74) *Attorney, Agent, or Firm* — Faegre Drinker Biddle & Reath LLP

(57) ABSTRACT

A cured epoxy resin, which is a cured product of an epoxy compound having a mesogenic structure and a curing agent having a molecular chain or a flexible backbone with a molecular weight of 100 or more, the cured epoxy resin having a smectic structure; a cured epoxy resin, which is a cured product of an epoxy compound having a mesogenic structure and a curing agent having a molecular chain or a flexible backbone with a molecular weight of 100 or more, the cured epoxy resin not having a smectic structure; an epoxy resin composition, comprising an epoxy compound having a mesogenic structure and a curing agent having a molecular chain with a molecular weight of 100 or more; and an epoxy resin composition, comprising an epoxy compound having a mesogenic structure and a curing agent having a flexible backbone with a molecular weight of 100 or more.

7 Claims, No Drawings

CURED EPOXY RESIN MATERIAL, EPOXY RESIN COMPOSITION, MOLDED ARTICLE, AND COMPOSITE MATERIAL

TECHNICAL FIELD

The invention relates to a cured epoxy resin composition, an epoxy resin composition, a molded article and a composite material.

BACKGROUND ART

Molded articles obtained by curing epoxy resin are highly heat-resistant and are widely used in various applications. However, while cured products of epoxy resin have superior heat resistance, they tend to have lower fracture toughness than thermoplastic resins.

As a method for improving the fracture toughness of epoxy resin, addition of a substance that improves the fracture toughness of epoxy resin has been proposed (see, for example, non-patent document 1).

PRIOR ART DOCUMENT

Non-Patent Document

[Non-Patent Document 1] Network Polymer, 20, 2, 97-110 (1999)

SUMMARY OF THE INVENTION

Problems to be Solved by the Invention

The method of adding a substance that improves the fracture toughness to epoxy resin may have problems such as reduction in production efficiency due to the process of adding the substance, or degradation in other properties of the cured epoxy resin. In particular, the glass transition temperature, which is an index of the heat resistance of cured epoxy resin, is generally negatively correlated with fracture toughness. Therefore, a technique of improving the fracture toughness of cured epoxy resin without significant deterioration in heat resistance is required.

In view of the foregoing, the invention aims to provide a cured epoxy resin that exhibits superior balance in fracture toughness and heat resistance; an epoxy resin composition that is capable of forming the cured epoxy resin; and a molded article and a composite material that include the cured epoxy resin.

Means for Solving the Problem

The means for solving the problem include the following embodiments.

<1> A cured epoxy resin, which is a cured product of an epoxy compound that has a mesogenic structure and a curing agent that has a molecular chain or a flexible backbone with a molecular weight of 100 or more, the cured epoxy resin having a smectic structure.

<2> A cured epoxy resin, which is a cured product of an epoxy compound that has a mesogenic structure and a curing agent that has a molecular chain or a flexible backbone with a molecular weight of 100 or more, the cured epoxy resin not having a smectic structure.

<3> An epoxy resin composition, comprising an epoxy compound that has a mesogenic structure and a curing agent that has a molecular chain with a molecular weight of 100 or more.

<4> An epoxy resin composition, comprising an epoxy compound that has a mesogenic structure and a curing agent that has a flexible backbone with a molecular weight of 100 or more.

<5> The cured epoxy resin according to <1> or <2>, or the epoxy resin composition according to <3> or <4>, wherein the curing agent has at least two functional groups and the molecular chain or the flexible backbone is disposed between the at least two functional groups.

<6> The cured epoxy resin according to <1> or <2>, or the epoxy resin composition according to any one of <3> to <5>, wherein the molecular chain or the flexible backbone includes at least one selected from the group consisting of an alkylene group, an alkyleneoxy group and a siloxane bond.

<7> The cured epoxy resin according to <1> or <2>, or the epoxy resin composition according to any one of <3> to <6>, wherein the curing agent includes an amine compound.

<8> The cured epoxy resin according to <1> or <2>, or the epoxy resin composition according to any one of <3> to <7>, wherein the curing agent includes an aromatic amine compound.

<9> The epoxy resin composition according to any one of <3> to <8>, having a fracture toughness of higher than 1.8 $MPa \cdot m^{1/2}$ in a cured state.

<10> The epoxy resin composition according to any one of <3> to <9>, having a glass transition temperature of higher than 120° C. in a cured state.

<11> The epoxy resin composition according to any one of <3> to <10>, having a total light transmittance of higher than 60%.

<12> A cured epoxy resin that is a cured product of the epoxy resin composition according to any one of <3> to <10>.

<13> A molded article, comprising the cured epoxy resin according to any one of <1>, <2> or <12>.

<14> A composite material, comprising the cured epoxy resin according to any one of <1>, <2> or <12> and a reinforcing material.

<15> The composite material according to <14>, having at least one cured product-containing layer that comprises the cured epoxy resin, and at least one reinforcing material-containing layer that comprises the reinforcing material.

Effects of the Invention

According to the invention, a cured epoxy resin that exhibits superior balance in fracture toughness and heat resistance; an epoxy resin composition that is capable of forming the cured epoxy resin; and a molded article and a composite material that include the cured epoxy resin are provided.

Embodiments for Implementing the Invention

In the following, embodiments for implementing the invention are explained. However, the invention is not limited to the embodiments. The elements of the embodiments (including steps) are not essential, unless otherwise stated. Further, the numbers and numerical ranges do not limit the invention.

In the disclosure, the "process" refers not only to a process that is independent from the other steps, but also to a step that cannot be clearly distinguished from the other steps, as long as the aim of the process is achieved.

In the disclosure, the numerical range represented by "A to B" includes A and B as a minimum value and a maximum value, respectively.

In the disclosure, when numerical ranges are described in a stepwise manner, the values of the upper or lower limit of each numerical range may be substituted by the values of the upper or lower limit of the other numerical range, or may be substituted by the values described in the Examples.

In the disclosure, when there is more than one kind of substance corresponding to a component of a composition, the content of the component refers to a total content of the substances, unless otherwise stated.

In the disclosure, when there is more than one kind of particles corresponding to a component of a composition, the particle size of the component refers to a particle size of a mixture of the more than one kind of particles.

In the disclosure, the epoxy compound refers to a compound having an epoxy group in its molecule. The epoxy resin refers to a collective concept of epoxy compounds that are not in a cured state.

<Cured Epoxy Resin>

The cured epoxy resin (First Embodiment) of the disclosure is a cured product of an epoxy compound that has a mesogenic structure and a curing agent that has a molecular chain or a flexible backbone with a molecular weight of 100 or more (hereinafter, also referred to as a "specific cured agent"), and the cured epoxy resin has a smectic structure.

The cured epoxy resin having the above-mentioned configuration exhibits a superior balance in fracture toughness and heat resistance, and is especially superior in fracture toughness. The reason for this is not exactly clear, but it is presumed as described below.

Since the cured epoxy resin is formed of an epoxy resin having a mesogenic structure, it exhibits superior fracture toughness as compared with cured epoxy resins in which an epoxy resin not having a mesogenic structure is used. Further, the flexible molecular structure of the specific curing agent functions to improve the fracture toughness, and the smectic structure of the cured epoxy resin contributes to the improvement in fracture toughness.

The cured epoxy resin (Second Embodiment) of the disclosure is a cured product of an epoxy compound that has a mesogenic structure and a curing agent that has a molecular chain or a flexible backbone with a molecular weight of 100 or more, and the cured epoxy resin does not have a smectic structure.

The cured epoxy resin having the above-mentioned configuration exhibits a superior balance in fracture toughness and heat resistance, and exhibits a certain degree of light permeability. The reason for this is not exactly clear, but it is presumed as described below.

Since the cured epoxy resin is formed of an epoxy resin having a mesogenic structure, it exhibits superior fracture toughness as compared with cured epoxy resins in which an epoxy resin not having a mesogenic structure is used. Further, the flexible molecular structure of the specific curing agent functions to improve the fracture toughness. Further, reduction in light permeability is suppressed due to the absence of smectic structure in the cured epoxy resin. A cured epoxy resin having light permeability has potential in various applications such as optical members.

Examples of the mesogenic structure of the epoxy compound having a mesogenic structure include a biphenyl structure, a phenyl benzoate structure, a cyclohexyl benzoate structure, an azobenzene structure, a stilbene structure, a terphenyl structure, an anthracene structure, derivatives of these structures, and a structure in which two or more of these structures are linked via a linking group.

In the disclosure, the higher-order structure refers to a structure in which structural elements are arranged to form a micro-and-organized structure. Examples of the higher-order structure include a crystalline phase and a liquid crystalline phase, and existence thereof can be determined with a polarizing microscope. Specifically, existence of a higher-order structure can be determined by whether or not an interference pattern due to depolarization is observed under crossed Nicols. A higher-order structure generally exists in a cured product of an epoxy resin composition and forms a domain structure in the form of an island, wherein each island corresponds to a higher-order structure. The structural elements of the higher-order structure are generally formed by covalent bonding.

Examples of a higher-order structure formed in a cured product include a nematic structure and a smectic structure, which are a liquid crystal structure, respectively. The nematic structure is a liquid crystal structure that has only an orientational order in which molecules are arranged in one direction. The smectic structure is a liquid crystal structure that has a one-dimensional order in addition to an orientational order, and forms a lamellar structure. The degree of order is higher in a smectic structure than in a nematic structure.

Whether or not a smectic structure is formed in a cured epoxy resin can be determined by X-ray diffraction measurement by using, for example, an X-ray diffractometer from Rigaku Corporation. When the measurement is performed using CuKα1 line under a tube voltage of 40 kV, a tube current of 20 mA and a measurement range $2\theta=1°$ to $30°$, and a diffraction peak is observed in a range of $2\theta=2°$ to $10°$, it is determined that a smectic structure is formed in a cured product. Alternatively, the existence or non-existence of a smectic structure can be determined by observing an interface pattern with a polarization microscope.

Whether or not a smectic structure is formed in a cured epoxy resin may be controlled by the curing conditions.

For example, since an epoxy resin has a property that formation of a smectic structure is promoted at high curing temperature, while it is suppressed at low curing temperature, the formation of smectic structure can be controlled by changing the curing temperature. However, the invention is not limited to this method.

The cured epoxy resin of the disclosure may be obtained by curing an epoxy resin composition as described later.

(Fracture Toughness)

The fracture toughness of the cured epoxy resin ($MPa \cdot m^{1/2}$) is not particularly limited, and may be adjusted depending on the use of the cured epoxy resin. For example, the fracture toughness of the cured epoxy resin is preferably more than 1.8 $MPa \cdot m^{1/2}$, more preferably 1.8 $MPa \cdot m^{1/2}$ or more, further preferably 2.0 $MPa \cdot m^{1/2}$ or more. The upper limit of the fracture toughness is not particularly limited, but is preferably 4.0 $MPa \cdot m^{1/2}$ or less, more preferably 3.7 $MPa \cdot m^{1/2}$ or less, further preferably 3.5 $MPa \cdot m^{1/2}$ or less, from the viewpoint of glass transition temperature (heat resistance).

The fracture toughness of the cured epoxy resin can be calculated from the results of three-point bending test performed by the method described in the Examples.

(Total Light Transmittance)

The total light transmittance (%) of the cured epoxy resin is not particularly limited, and may be adjusted depending on the use of the cured epoxy resin. For example, the total light transmittance of the cured epoxy resin is preferably more than 60%, more preferably 65% or more, further preferably 70% or more. The upper limit of the total light transmittance is not particularly limited, but is preferably 95% or less, more preferably 93% or less, further preferably 90% or less, from the viewpoint of other properties.

The total light transmittance of the cured epoxy resin can be measured by the method described in the Examples, for example.

(Glass Transition Temperature)

The glass transition temperature (° C.) is not particularly limited, and may be adjusted depending on the use of the cured epoxy resin. From the viewpoint of heat resistance, the glass transition temperature of the cured epoxy resin is preferably more than 120° C., more preferably 125° C. or more, further preferably 130° C. or more. From the viewpoint of maintaining favorable fracture toughness, the glass transition temperature of the cured epoxy resin is preferably 350° C. or less, more preferably 300° C. or less, further preferably 250° C. or less.

The glass transition temperature of the cured epoxy resin can be calculated from the result of the dynamic viscoelasticity measurement performed by the method described in the Examples, for example.

<Epoxy Resin Composition>

The epoxy resin composition (First embodiment) of the disclosure includes an epoxy compound having a mesogenic structure and a specific curing agent.

The survey conducted by the inventors found that the epoxy resin composition having the above-mentioned configuration is capable of forming a cured epoxy resin that has a favorable balance in fracture toughness and heat resistance. The reason for this is not exactly clear, but it is presumed that the flexible molecular structure of the specific curing agent functions to enhance the fracture toughness of the cured epoxy resin.

According to the epoxy resin composition of the disclosure, it is possible to obtain both a cured epoxy resin having a smectic structure (First embodiment) and a cured epoxy resin not having a smectic structure (Second embodiment). For example, it is possible to obtain a desired cured epoxy resin by controlling the curing conditions of the epoxy resin composition. Therefore, according to the epoxy resin composition, improvement productivity of cured epoxy resins, or extension of the range of applications of cured epoxy resins, can be anticipated.

The epoxy resin composition may include an epoxy compound that is not an epoxy compound having a mesogenic structure. In that case, the proportion of the epoxy compound having a mesogenic structure in the total epoxy resin is preferably 80% by mass or more, more preferably 90% by mass or more.

The epoxy resin composition may include a curing agent that is not a specific curing agent. In that case, the proportion of the specific curing agent in the total epoxy resin is preferably 80% by mass or more, more preferably 90% by mass or more.

(Epoxy Compound Having Mesogenic Structure)

The epoxy resin composition may include a single kind of an epoxy compound having a mesogenic structure, or may include two or more kinds thereof.

The structure of the epoxy compound having a mesogenic structure is not particularly limited, but the epoxy resin composition preferably include an epoxy resin represented by the following Formula (A).

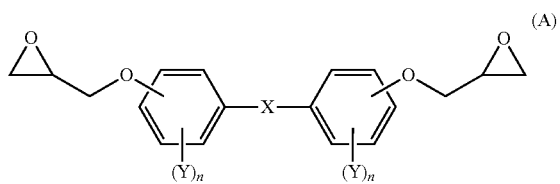

In Formula (A), X represents a linking group that includes at least one divalent group selected from the following Group (I); each of Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; and each of n independently represents an integer from 0 to 4.

Group (I)

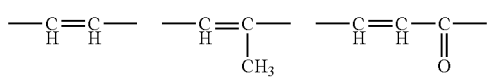

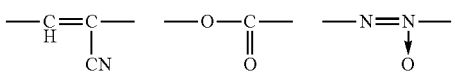

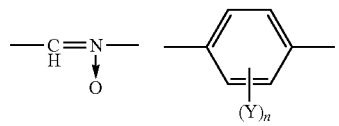

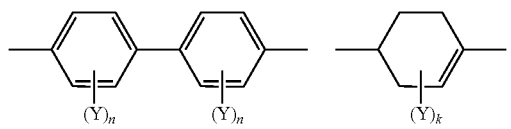

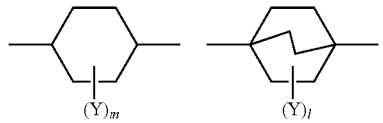

In Group (I), each of Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each of n independently represents an integer from 0 to 4; k represents an integer from 0 to 7; m represents an integer from 0 to 8; and l represents an integer from 0 to 12.

In Formula (A) and Group (I), each of Y is preferably independently an aliphatic hydrocarbon group having 1 to 8 carbon atoms, more preferably a methyl group. Each of n, k, m and l is preferably independently 0.

The epoxy compound having a mesogenic structure may be a compound having a linking group that includes each of the divalent groups as described below.

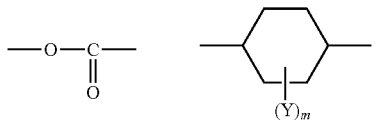

The epoxy compound having a mesogenic structure may be an epoxy compound having at least one structure represented by the following Formula (I).

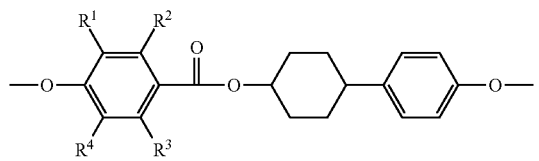

In Formula (I), each of $R^1$ to $R^4$ independently represents a hydrogen atom or an alkyl group having 1 to 3 carbon atoms, preferably a hydrogen atom or an alkyl group having 1 or 2 carbon atoms, more preferably a hydrogen atom or a methyl group. The number of hydrogen atoms represented by $R^1$ to $R^4$ is preferably 2 to 4, more preferably 3 or 4, further preferably 4. When any of $R^1$ to $R^4$ is an alkyl group having 1 to 3 carbon atoms, the alkyl group having 1 to 3 carbon atoms is preferably at least one of $R^1$ or $R^4$.

Examples of the epoxy compound having one of the structure represented by the following Formula (I) include an epoxy compound represented by the following Formula (M).

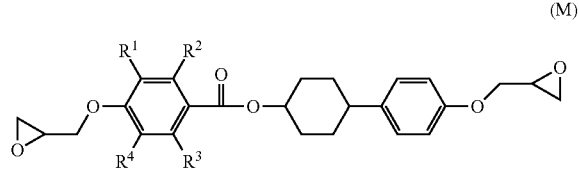

The specific examples and preferred ranges of $R^1$ to $R^4$ in Formula (M) are the same as the specific examples and preferred ranges of $R^1$ to $R^4$ in Formula (I).

Examples of the epoxy compound represented by Formula (M) include a compound described in Japanese Patent Application Laid-Open No. 2011-74366, i.e., at least one selected from the group consisting of (4-{4-(2,3-epoxypropoxy)phenyl}cyclohexyl=4-(2,3-epoxypropoxy)benzoate and (4-{4-(2,3-epoxypropoxy)phenyl}cyclohexyl=4-(2,3-epoxypropoxy)-3-methylbenzoate.

Examples of the epoxy compound having two of the structure represented by Formula (I) include an epoxy compound having at least one of the structures represented by the following Formula (II-A) and Formula (II-B).

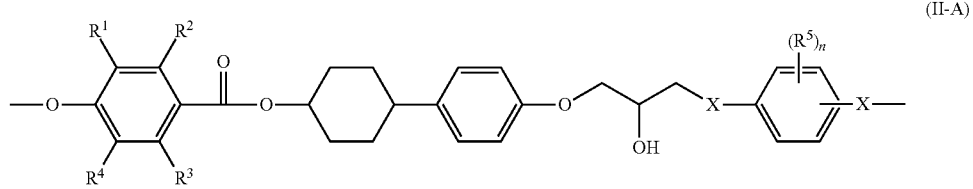

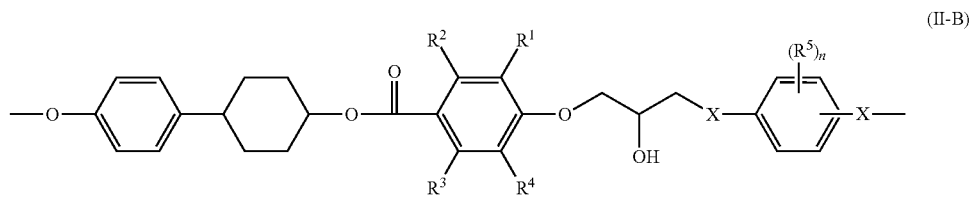

The specific examples and preferred ranges of $R^1$ to $R^4$ in Formula (II-A) and Formula (II-B) are the same as the specific examples and preferred ranges of $R^1$ to $R^4$ in Formula (I). Each of $R^5$ independently represents an alkyl group having 1 to 8 carbon atoms, preferably an alkyl group having 1 to 3 carbon atoms, more preferably a methyl group. Each of X independently represents —O— or —NH—.

In Formula (II-A) and Formula (II-B), each of n independently represents an integer of 0 to 4, preferably an integer of 0 to 2, more preferably 0 or 1, further preferably 0.

From the viewpoint of forming a higher-order structure in the cured epoxy resin in an effective manner, epoxy compounds having a structure represented by the following Formula (II-a) or the following Formula (II-b) are preferred.

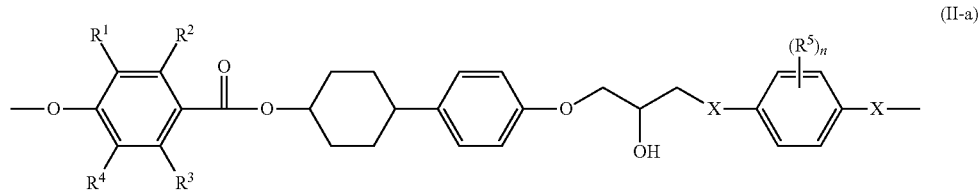

(II-a)

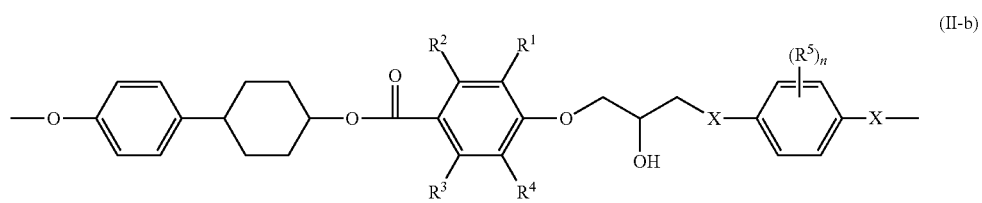

(II-b)

The definitions and preferred ranges of $R^1$ to $R^5$, n and X in Formula (II-a) and Formula (II-b) are the same as the definitions and preferred ranges of $R^1$ to $R^5$, n and X in Formula (II-A) and Formula (II-B).

Examples of the epoxy compound having two of the structure represented by Formula (I) include at least one of epoxy compounds represented by the following Formula (III-A) to Formula (III-C).

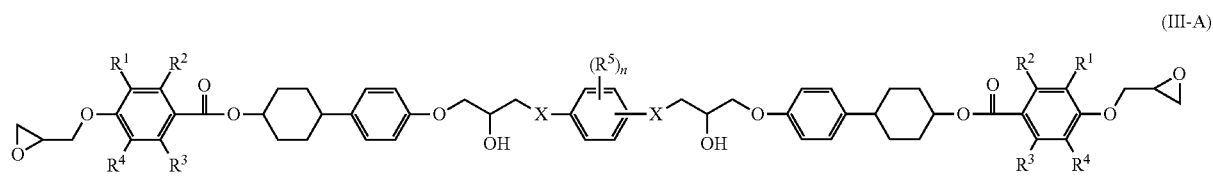

(III-A)

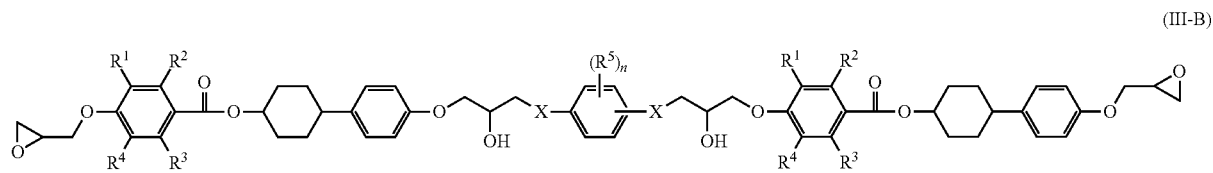

(III-B)

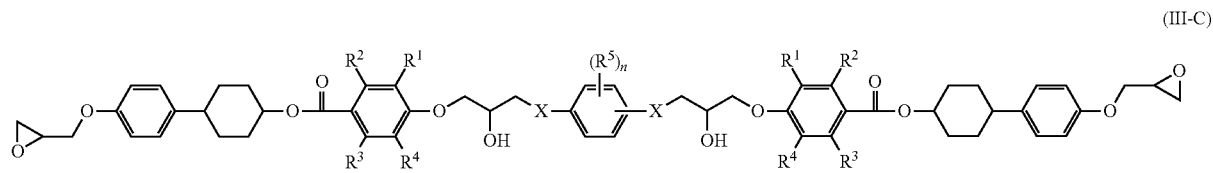

(III-C)

The definitions and preferred ranges of $R^1$ to $R^5$, n and X in Formula (III-A) to Formula (III-C) are the same as the definitions and preferred ranges of $R^1$ to $R^5$, n and X in Formula (II-A) and Formula (II-B).

From the viewpoint of forming a higher-order structure in the cured epoxy resin in an effective manner, epoxy compounds having a structure represented by any of the following Formula (III-a) to Formula (III-c) are preferred.

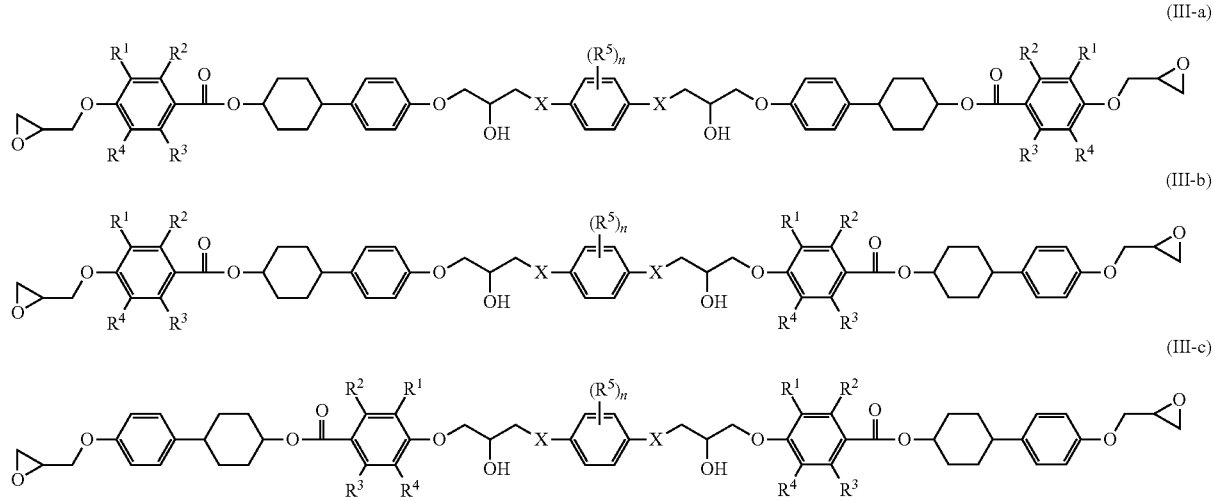

The definitions and preferred ranges of $R^1$ to $R^5$, n and X in Formula (III-a) to Formula (III-c) are the same as the definitions and preferred ranges of $R^1$ to $R^5$, n and X in Formula (III-A) to Formula (III-C).

The epoxy compound may be a combination of an epoxy compound having one mesogenic structure and an epoxy compound having two or more mesogenic structures. For example, the epoxy compound may be a combination of an epoxy compound having one structure represented by Formula (I) and an epoxy compound having two or more structures represented by Formula (I).

In the above-mentioned combination, the number of the mesogenic structure (one or at least two) refers to the number of the mesogenic structure that is present in both of the epoxy compound having one mesogenic structure and an epoxy compound having two or more mesogenic structures, and the presence of a mesogenic structure that is not present in common in the epoxy compounds is not considered.

Examples of the combination of an epoxy compound having one mesogenic structure and an epoxy compound having two or more mesogenic structures include an epoxy compound having one mesogenic structure (hereinafter, also referred to as an epoxy monomer) and an epoxy compound having two or more mesogenic structures that is obtained through reaction of epoxy monomers (hereinafter, also referred to as a multimer).

The method of obtaining a multimer through reaction of epoxy monomers is not particularly limited, and examples thereof include a method of causing self-polymerization of epoxy monomers and a method of allowing an epoxy monomer to react with a compound having a functional group that can react with an epoxy group of the epoxy monomer.

In a case of obtaining a multimer through reaction of epoxy monomers, the synthesis conditions may be adjusted such that some of the epoxy monomer remain unreacted, and both of the epoxy monomer and the multimer are present in the reaction product.

From the viewpoint of controlling the molecular weight of the multimer, proportion of the multimer and the epoxy monomer in the reaction product and the like, a method of synthesizing a multimer by allowing an epoxy monomer to react with a compound having a functional group that can react with an epoxy group is preferred.

The method of reacting a mesogenic epoxy monomer and a compound having a functional group that can react with an epoxy group of the mesogenic epoxy monomer is not specifically limited. Specifically, for example, the reaction can be performed by dissolving a mesogenic epoxy monomer and a compound having a functional group that is capable of reacting with an epoxy group of the mesogenic epoxy monomer, and optionally a reaction catalyst, in a solvent, and stirring the same while heating.

Alternatively, for example, the synthesis can be performed mixing an epoxy monomer and a compound having a functional group that can react with an epoxy group, and optionally a reaction catalyst, without using a solvent and stirring the mixture while heating.

The solvent used for the synthesis is not particularly limited, as long as it can dissolve an epoxy monomer and a compound having a functional group that is capable of reacting with an epoxy group, and can be heated to a temperature that is required to cause reaction of the compounds. Specific examples of the solvent include cyclohexanone, cyclopentanone, ethyl lactate, propyleneglycol monomethyl ether, N-methyl pyrrolidone, methyl cellosolve, ethyl cellosolve, and propyleneglycol monopropyl ether.

The amount of the solvent is not particularly limited, as long as an epoxy monomer, a compound having a functional group that is capable of reacting with an epoxy group, and optionally a reaction catalyst, can be dissolved at a reaction temperature. Although the degree of solubility depends on the type of the raw materials, the solvent and the like, the viscosity of the solvent after the reaction tends to be in a preferred range when the solvent is added to adjust the initial solid content concentration to be from 20% by mass to 60% by mass, for example.

The compound having a functional group that is capable of reacting with an epoxy group is not particularly limited. From the viewpoint of forming a smectic structure in the cured epoxy resin, the compound is preferably at least one selected from the group consisting of a dihydrozybenzene compound, having a structure in which two hydroxy groups are bonded to a benzene ring, and a diaminobenzene compound, having a structure in which two amino groups are bonded to a benzene ring. Hereinafter, the dihydrozybenzene compound and the diaminobenzene compound are also referred to as a specific aromatic compound.

Examples of the dihydroxy compound include 1,2-dihydroxybenzene (catechol), 1,3-dihydroxybenzene (resorcinol), 1,4-dihydrozybenene (hydroquinone) and derivatives thereof.

Examples of the diaminobenzene compound include 1,2-diaminobenzene, 1,3-diaminobenzene, 1,4-diaminobenzene and derivative thereof.

Derivatives of the specific aromatic compound include a specific aromatic compound having a substitute, such as an alkyl group of from 1 to 8 carbon atoms, on the benzene ring. A single kind of the specific aromatic compound may be used alone, or two or more kinds may be used in combination.

From the viewpoint of forming a smectic structure in the cured epoxy resin, the specific aromatic compound is preferably at least one selected from 1,4-dihydrozybenene and 1,4-diaminobenzene. These compounds has the hydroxy groups or the amino groups at para position on the benzene ring, and a compound obtained through reaction with an epoxy monomer tends to have a linear structure. Therefore, it is considered that the molecules have a high degree of stacking property and is prone to form a smectic structure in a cured product.

The type of the reaction catalyst is not particularly limited, and may be selected depending on the reaction rate, reaction temperature, storage stability, and the like. Specific examples of the reaction catalyst include an imidazole compound, an organic phosphorous compound, a tertiary amine compound and a quaternary ammonium salt. A single kind of the reaction catalyst may be used alone, or two or more kinds may be used in combination.

From the viewpoint of thermal resistance of the cured epoxy resin, the reaction catalyst is preferably an organic phosphorous compound.

Preferred examples of the organic phosphorous compound include an organic phosphine compound; a compound having intermolecular polarization obtained by adding, to an organic phosphine compound, a compound having a π bond such as a maleic acid anhydride, a quinone compound, diazodiphenyl methane or a phenol resin; and a complex formed by an organic phosphine compound and an organic boron compound.

Specific examples of the organic phosphine compound include triphenylphosphine, diphenyl(p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl)phosphine, tris(dialkoxyphenyl)phosphine, tris(trialkoxyphenyl)phosphine, tris(tetraalkoxyphenyl)phosphine, trialkylphosphine, dialkylarylphosphine, and alkyldiarylphosphine.

Specific examples of the quinone compound include 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone, and phenyl-1,4-benzoquinone.

Specific examples of the organic boron compound include tetraphenyl borate, tetra-p-tolyl borate and tetra-n-butyl borate.

The amount of the reaction catalyst is not particularly limited. From the viewpoint of reaction rate and storage stability, the amount of the reaction catalyst is preferably from 0.1 parts by mass to 1.5 parts by mass, more preferably from 0.2 parts by mass to 1 part by mass, with respect to 100 parts by mass of the total amount of the epoxy monomer and the compound having a functional group that is capable of reacting with an epoxy group.

In a case of synthesizing a multimer by using an epoxy monomer, the total of the epoxy monomer may react to form a multimer, or the epoxy monomer may partly remain in an unreacted state.

The multimer can be synthesized by using a reaction container, such as a flask in a small scale or a reaction cauldron in a large scale. A specific example of the synthesis method is described below.

An epoxy monomer is placed in a reaction container and a solvent is added as necessary, and the epoxy monomer is dissolved by heating the reaction container to a reaction temperature with an oil bath or a heating medium. Then, a compound having a functional group that is capable of reacting with an epoxy group is added thereto. After dissolving the compound in the solvent, a reaction catalyst is added as necessary, thereby starting the reaction. Subsequently, the solvent is removed under reduced pressure as necessary, whereby a multimer is obtained.

The reaction temperature is not particularly limited, as long as the reaction of a mesogenic epoxy group and a functional group that is capable of reacting with an epoxy group can proceed. For example, the reaction temperature is preferably in a range of from 100° C. to 180° C., more preferably from 100° C. to 150° C. When the reaction temperature is 100° C. or higher, the time for completing the reaction tends to be shortened. When the reaction temperature is 180° C. or less, possibility of causing gelation tends to be reduced.

The ratio of the epoxy monomer to the compound having a functional group that is capable of reacting with an epoxy group, used for the synthesis, is not particularly limited. For example, the ratio may be adjusted to satisfy a ratio of the number of equivalent of epoxy group (A) to the number of equivalent of the functional group that is capable of reacting with an epoxy group (B), represented by A/B, of from 100/100 to 100/1. From the viewpoint of fracture toughness and heat resistance of a cured product, the range of A/B is preferably from 100/5 to 100/1.

The structure of the multimer can be determined by, for example, matching a molecular weight of the multimer, which is presumed to be obtained by the reaction of the epoxy monomer and the compound having a functional group that is capable of reacting with an epoxy group, with a molecular weight of a target compound obtained by liquid chromatography that is performed by a liquid chromatograph having a UV spectrum detector and a mass spectrum detector.

The weight-average molecular weight (Mw) of the epoxy resin is not particularly limited, and may be adjusted depending on the desired properties of the epoxy resin.

(Specific Curing Agent)

The specific curing agent is not particularly limited, as long as it is capable of causing curing reaction with the epoxy resin included in the epoxy resin composition. Specific examples of the curing agent include an amine curing agent, a phenol curing agent, an acid anhydride curing agent, a polymercaptan curing agent, a polyaminoamide curing agent, an isocyanate curing agent, and a block isocyanate curing agent. A single kind of the curing agent may be used alone, or two or more kinds may be used in combination.

The curing agent is preferably an amine curing agent, which has an amino group as a functional group that reacts with an epoxy group, or a phenol curing agent, which has a hydroxy group as a functional group that reacts with an epoxy group. From the viewpoint of heat resistance, an amine curing agent is preferred. From the viewpoint of controlling the time for curing reaction, a compound having an aromatic ring to which an amino group is bonded (aromatic amine compound) is preferred. Preferred examples of the aromatic ring include a benzene ring and a naphthalene ring.

From the viewpoint of improving the fracture toughness, the molecular weight of the molecular chain of the specific curing agent, which is 100 more, is preferably 110 or more, more preferably 120 or more. The upper limit of the molecular weight of the molecular chain is not particularly limited, and is preferably 10,000 or less, more preferably 5,000 or less, from the viewpoint of glass transition temperature.

From the viewpoint of improving the fracture toughness, the molecular weight of the flexible backbone of the specific curing agent is preferably 100 more, more preferably 110 or more, further preferably 120 or more. The upper limit of the molecular weight of the flexible backbone is not particularly limited, and is preferably 10,000 or less, more preferably 5,000 or less, from the viewpoint of glass transition temperature.

From the viewpoint of improving the fracture toughness, the specific curing agent is preferably a compound that has at least two functional groups and a molecular chain or a flexible backbone with a molecular weight of 100 or more, and the molecular chain or the flexible backbone is disposed between the functional groups.

In an embodiment, the specific curing agent may be a compound that has at least two amino groups and a molecular chain or a flexible backbone with a molecular weight of 100 or more, and the molecular chain or the flexible backbone is disposed between the amino groups.

In an embodiment, the specific curing agent may be a compound that has at least two aromatic rings to which an amino group is bonded, and has a molecular chain or a flexible backbone with a molecular weight of 100 or more between the aromatic rings.

The molecular chain or the flexible backbone with a molecular weight of 100 or more may be linear or branched, preferably linear from the viewpoint of improving fracture toughness.

The structure of the molecular chain or the flexible backbone with a molecular weight of 100 or more is not particularly limited, and examples thereof include a structure that includes at least one selected from the group consisting of an alkylene group, an alkyleneoxy group and a siloxane bond.

(Other Curing Agents)

When the epoxy resin composition includes a curing agent that is not a specific curing agent, the type of the curing agent is not particularly limited.

Specific examples of the curing agent that is not a specific curing agent include 3,3'-diaminodiphenylsulfone, 4,4'-diaminodiphenylsulfone, 4,4'-diaminodiphenylmethane, 4,4'-diaminodiphenylether, 4,4'-diamino-3,3'-dimethoxybiphenyl, 4,4'-diaminophenylbenzoate, 1,5-diaminonaphthalene, 1,3-diaminonaphthalene, 1,4-diaminonaphthalene, 1,8-diaminonaphthalene, 1,3-diaminobenzene, 1,4-diaminobenzene, 4,4'-diaminobenzanilide, and trimethylene-bis-4-aminobenzoate.

The amount of the curing agent in the epoxy resin composition is not particularly limited. From the viewpoint of efficiency of curing reaction, the amount of the curing agent preferably satisfies a ratio of equivalent amount A of the functional group (active hydrogen in a case of amine curing agent) of the curing agent in the epoxy resin composition with respect to equivalent amount B of the epoxy group of the epoxy resin (A/B) of from 0.3 to 3.0, more preferably from 0.5 to 2.0.

(Other Components)

The epoxy resin composition may include components other than the epoxy resin and the curing agent. For example, the epoxy resin composition may include a curing catalyst, a filler or the like. Specific examples of the curing catalyst include the compounds as described above as a reaction catalyst used for the synthesis of the specific epoxy compound.

<Molded Article>

The molded article of the disclosure includes the cured epoxy resin of the disclosure.

The use of the molded article is not particularly limited. For example, since the cured epoxy resin can achieve a favorable light permeability, by not forming a smectic structure therein, the molded article is suitable for the field that require transparency, such as optical members.

<Composite Material>

The composite material of the disclosure include the cured epoxy resin of the disclosure and a reinforcing material.

The reinforcing material is not particularly limited, and may be selected depending on the application of the composite material and the like. Specific examples of the reinforcing material include glass, aromatic polyamide resins such as Kevlar (registered trade name), ultra high molecular weight polyethylene, alumina, boron nitride, aluminum nitride, mica and silicon. The form of the reinforcing material is not particularly limited, and examples thereof include fibers and particles (filler). The composite material may include a single kind of reinforcing material alone, or may include two or more kinds in combination.

The configuration of the composite material is not particularly limited. For example, the composite material may include at least one cured product-containing layer that includes the cured epoxy resin, and at least one reinforcing material-containing layer that includes the reinforcing material. In that case, the cured product-containing layer may include the reinforcing material, and the reinforcing material-containing layer may include the cured epoxy resin.

EXAMPLES

In the following, the invention is explained by referring to the Examples. However, the invention is not limited to these Examples.

(Synthesis of Epoxy Resin B)

To a 500-mL three-necked flask, 50 parts by mass of epoxy compound A having the following structure (refer to Japanese Patent No. 5471975) were placed and 80 parts by mass of a solvent (cyclohexanone) were added. A cooling tube and a nitrogen inlet tube were attached to the flask, and a stirring blade was attached so as to be immersed in the solvent. Then, the flask was immersed in an oil bath at 160° C. and subjected to stirring.

A few minutes after the start of stirring, it was confirmed that the epoxy compound was dissolved in the solvent and the mixture became a clear solution. To the solution, 1.6 parts by mass of specific aromatic compound A (hydroquinone) were added, and then 0.5 parts by mass of a reaction catalyst (triphenylphosphine) were added. After continuing the heating of the solution for 5 hours in an oil bath at 160° C., cyclohexanone was evaporated and the residue was cooled to room temperature (25° C.), thereby obtaining epoxy resin B. Epoxy resin B included a reaction product of epoxy compound A and specific aromatic compound A, unreacted epoxy compound A, and a part of the solvent.

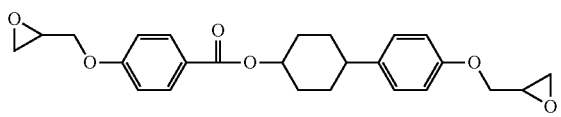

(Synthesis of Epoxy Resin C)

Epoxy resin C was synthesized in the same manner as the synthesis of epoxy resin B, except that the amount of specific aromatic compound A (hydroquinone) was changed from 1.6 parts by mass to 3.1 parts by mass. Epoxy resin C included a reaction product of epoxy compound A and specific aromatic compound A, unreacted epoxy compound A, and a part of the solvent.

(Synthesis of Epoxy Resin D)

Epoxy resin D was synthesized in the same manner as the synthesis of epoxy resin B, except that specific aromatic compound A (hydroquinone) was changed to specific aromatic compound B (biphenol) and that the amount thereof was changed from 1.6 parts by mass to 4.3 parts by mass. Epoxy resin D included a reaction product of epoxy compound A and specific aromatic compound A, unreacted epoxy compound A, and a part of the solvent.

Example 1

To 100.0 parts by mass (non-volatile content) of epoxy resin B, 43.5 parts by mass of poly(1,4-butandiol)bis(4-aminobenzoic acid) (number average molecular weight: 470, SIGMA-ALDRICH) were added to prepare a resin composition. The resin composition was placed in a stainless dish and heated at 180° C. with a hot plate. After the resin composition was melted, the resin composition was heated at 150° C. for 2 hours. After cooling to room temperature (25° C.), the sample was taken out of the dish and heated at 230° C. for 1 hour in an oven, thereby obtaining a cured epoxy resin.

The cured epoxy resin was polished to a size of 3.75 mm in thickness, and a sample for measuring total light transmittance was prepared. Further, a sample for measuring fracture toughness with a size of 3.75 mm×7.5 mm×33 mm and a sample for measuring glass transition temperature with a size of 2 mm×0.5 mm×40 mm were prepared from the cured epoxy resin.

Example 2

To 100.0 parts by mass (non-volatile content) of epoxy compound A, 52.5 parts by mass of poly(1,4-butandiol)bis (4-aminobenzoic acid) were added to prepare a resin composition. The resin composition was placed in a stainless dish and heated at 200° C. with a hot plate. After the resin composition was melted, the resin composition was heated at 200° C. for 1 hour. After cooling to room temperature (25° C.), the sample was taken out of the dish and heated at 230° C. for 1 hour in an oven, thereby obtaining a cured epoxy resin. Samples for measurement were prepared from the cured epoxy resin in the same manner with Example 1.

Example 3

A cured epoxy resin and samples were prepared in the same manner to Example 2, except that 100.0 parts by mass (non-volatile content) of epoxy resin B and 43.5 parts by mass of poly(1,4-butandiol)bis(4-aminobenzoic acid) were used.

Example 4

A cured epoxy resin and samples were prepared in the same manner to Example 2, except that 100.0 parts by mass (non-volatile content) of epoxy resin C and 35.2 parts by mass of poly(1,4-butandiol)bis(4-aminobenzoic acid) were used.

Example 5

A cured epoxy resin and samples were prepared in the same manner to Example 2, except that 100.0 parts by mass (non-volatile content) of epoxy resin D and 35.6 parts by mass of poly(1,4-butandiol)bis(4-aminobenzoic acid) were used.

Comparative Example 1

A cured epoxy resin and samples were prepared in the same manner to Example 2, except that 100.0 parts by mass (non-volatile content) of epoxy resin B and 18.4 parts by mass of diaminodiphenylmethane (Fujifilm Wako Pure Chemical Corporation) were used, and that the temperature of the hot plate was changed to 150° C.

Comparative Example 2

A cured epoxy resin and samples were prepared in the same manner to Example 2, except that 100.0 parts by mass (non-volatile content) of bisphenol A epoxy resin (YL980, Mitsubishi Chemical Corporation) and 26.6 parts by mass of diaminodiphenylmethane (Fujifilm Wako Pure Chemical Corporation) were used, and that the temperature of the hot plate was changed to 150° C.

Comparative Example 3

A cured epoxy resin and samples were prepared in the same manner to Example 2, except that 100.0 parts by mass (non-volatile content) of bisphenol A epoxy resin (YL980, Mitsubishi Chemical Corporation) and 63.2 parts by mass of poly(1,4-butandiol)bis(4-aminobenzoic acid) were used.

Comparative Example 4

An acrylic resin sheet (RS Pro, RS Components) was polished to 3.75 mm in thickness to prepare a sample for measuring the total light transmittance. Further, a sample for measuring fracture toughness with a size of 3.75 mm×7.5 mm×33 mm and a sample for measuring glass transition temperature with a size of 2 mm×0.5 mm×40 mm were prepared from the acrylic resin sheet.

(Fracture Toughness)

The fracture toughness of the samples prepared in the Examples and the Comparative Examples was measured by performing a three-point bending test according to ASTM D5045, and the fracture toughness (MPa·m$^{1/2}$) was calculated based on the result of a three-point bending test. The measurement was performed by using a tester (Instron 5948, Instron). The results are shown in Table 1.

(Glass Transition Temperature)

The glass transition temperature (° C.) was calculated from the result of the measurement of dynamic viscoelasticity at tensile mode of the samples prepared in the Examples and the Comparative Examples. The measurement was performed at a frequency of 10 Hz, a temperature increase rate of 5° C./min, and a torsion of 0.1%. The peak obtained in the tan δ chart was assumed to be the glass transition temperature. The measurement was performed using a dynamic viscoelastometer (RSA-G2, TA Instruments). The results are shown in Table 1.

(Total Light Transmittance)

The total light transmittance (%) of the samples prepared in the Examples and the Comparative Examples was measured with a haze meter (NDH-5000, Nippon Denshoku Industries, Co., Ltd.) using a sample having a thickness of 3.75 mm. The results are shown in Table 1. In a case in which a smectic structure was formed in the sample, the measurement was not performed since the total light transmittance was significantly low. The results are shown in Table 1.

(Smectic Structure)

Whether or not a smectic structure was formed in the cured epoxy resin was determined by the existence or non-existence of a diffraction peak in X-ray diffraction measurement under the above-mentioned conditions. The results are shown in Table 1, in which YES refers to "there is a smectic structure" and NO indicates "there is no smectic structure".

TABLE 1

| | Fracture toughness (MPa · m$^{1/2}$) | Glass transition temperature (° C.) | Total light transmittance (%) | Smectic structure |
|---|---|---|---|---|
| Example 1 | 3.0 | 133 | — | YES |
| Example 2 | 2.3 | 134 | 74 | NO |
| Example 3 | 2.2 | 133 | 76 | NO |
| Example 4 | 2.1 | 138 | 79 | NO |
| Example 5 | 2.3 | 138 | 67 | NO |
| Comparative Example 1 | 2.0 | 190 | — | YES |
| Comparative Example 2 | 0.8 | 186 | 74 | NO |
| Comparative Example 3 | 2.8 | 112 | 76 | NO |
| Comparative Example 4 | 1.8 | 105 | 89 | NO |

As shown in Table 1, the cured epoxy resin of Example 1, obtained by using an epoxy compound having a mesogenic structure and a specific curing agent, exhibits significant improvement in fracture toughness, as compared with the cured epoxy resin of Comparative Example 1, obtained by using an epoxy compound having a mesogenic structure and a curing agent that is not a specific curing agent. Although the cured epoxy resin of Example 1 exhibits a lower glass transition temperature, it is still sufficient for practical use.

The cured epoxy resin of Comparative Example 3, obtained by using an epoxy compound not having a mesogenic structure and a specific curing agent, exhibits an improved fracture toughness as compared with the cured epoxy resin of Comparative Example 2, obtained by using an epoxy compound not having a mesogenic structure and a curing agent that is not a specific curing agent. However, the glass transition temperature is significantly low.

In Examples 2 to 5, in which the heating temperature with a hot plate was 200° C., a smectic structure is not formed in the cured epoxy resin and the total light transmittance is higher than 60%.

In Comparative Example 4, in which an acrylic resin sheet was used, the total light transmittance is as high as 89%, but the fracture toughness and the glass transition temperature are lower than the Examples.

All publications, patent applications, and technical standards mentioned in this specification are herein incorporated by reference to the same extent as if each individual publication, patent application, or technical standard was specifically and individually indicated to be incorporated by reference.

The invention claimed is:

1. A cured product of an epoxy resin composition, wherein the epoxy resin composition comprises an epoxy resin and an amine curing agent;
   wherein the epoxy resin is capable of forming a cured material having a smectic structure and comprises: an epoxy multimer, which is a reaction product of an epoxy monomer and at least one of a dihydroxybenzene compound and a diaminobenzene compound; and an unreacted epoxy monomer;
   wherein the epoxy monomer and the unreacted epoxy monomer are represented by formula (M):

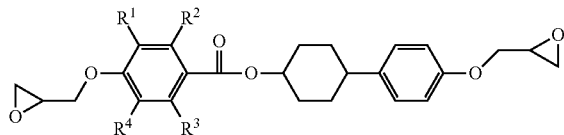

wherein each of R$^1$ to R$^4$ independently represents a hydrogen atom or an alkyl group having 1 to 3 carbon atoms;
   wherein the amine curing agent is a compound that has at least two aromatic rings to which an amino group is bonded and a molecular chain or a flexible backbone between the aromatic rings, with each of the molecular chain and the flexible backbone having a molecular weight of 100 or more; and
   wherein the cured product does not have a smectic structure and does have a total light transmittance of higher than 60%.

2. The cured product according to claim 1, wherein the molecular chain or the flexible backbone includes at least one selected from the group consisting of an alkylene group, an alkyleneoxy group and a siloxane bond.

3. The cured product according to claim 1, wherein the curing agent is a compound that has two aromatic rings to which an amino group is bonded and a molecular chain or a flexible backbone between the aromatic rings, with each of the molecular chain and the flexible backbone having a molecular weight of 100 or more.

4. The cured product according to claim 1, wherein the curing agent is poly(1,4-butandiol)bis(4-aminobenzoic acid).

5. A molded article, comprising the cured product according to claim 1.

6. A composite material, comprising the cured product according to claim 1 and a reinforcing material.

7. The composite material according to claim 6, having at least one layer that comprises the cured product, and at least one layer that comprises the reinforcing material.

* * * * *